United States Patent [19]

Sparer et al.

[11] Patent Number: 5,062,052
[45] Date of Patent: Oct. 29, 1991

[54] LOGIC CONTROLLED PLASTIC MOLDING MACHINE WITH PROGRAMMABLE OPERATOR INTERFACE

[75] Inventors: Ronald M. Sparer, Madeira; Dale P. Werle, Batavia, both of Ohio

[73] Assignee: Cincinnati Milacron, Inc., Cincinnati, Ohio

[21] Appl. No.: 368,570

[22] Filed: Jun. 20, 1989

[51] Int. Cl.⁵ .............................................. G06F 15/46
[52] U.S. Cl. ................................... 364/473; 364/189; 364/476; 425/135
[58] Field of Search ............... 364/135, 138, 188, 189, 364/180, 48, 473, 500, 551.01, 476; 425/135

[56] References Cited

U.S. PATENT DOCUMENTS

| 4,457,772 | 7/1984 | Haynes et al. | 364/473 |
| 4,805,039 | 2/1989 | Lane et al. | 364/188 |
| 4,910,658 | 3/1990 | Dudash et al. | 364/138 |

OTHER PUBLICATIONS

Cincinnati Milacron, Inc., "Basic Control Documentation for the DPC-270 Control System", Aug. 28, 1987, chapters 1 and 5.

Primary Examiner—Jerry Smith
Assistant Examiner—Paul Gordon
Attorney, Agent, or Firm—Wood, Herron & Evans

[57] ABSTRACT

A plastics molding machine is provided with a control architecture which includes a dedicated programmed logic controller, a real time analog signal processor, an operator interface station, and a general purpose open architecture digital computer. The computer accepts data entered by an operator from a keyboard on the operator station panel, displays information to the operator, performs analysis of process monitoring and control data, and generates commands to the controller. The controller simultaneously controls the real time digital and analog functions of the machine. The analog functions are controlled in response to analog signals from the controller by performing real time closed loop servo control of analog and other machine functions.

13 Claims, 5 Drawing Sheets

LOGIC CONTROLLED PLASTIC MOLDING MACHINE WITH PROGRAMMABLE OPERATOR INTERFACE

The present invention relates to plastics processing machines which operate under the control of dedicated logic process controllers, particularly controllers providing analog control functions, and those having operator stations for data entry and process monitoring.

BACKGROUND OF THE INVENTION

Plastic processing machines include various types of machines for forming manufactured articles from plasticly moldable material. These include plastic molding machines of the injection molding type, blow molding machines, extruders, and other such plastics processing apparatus. The VT series injection molding machines manufactured by Cincinnati Milacron of Cincinnati, Ohio are examples of plastic processing machinery of the type to which the present invention relates. Such machines operate in accordance with a processing sequence by which plastic material is usually heated or otherwise plasticized, forced into contact with mold surfaces or other forming devices, set, then ejected as a formed part.

In general, the operation of such molding machines includes the movement of pistons, clamps, screws, conveyors, ejectors and other mechanisms, the control of feeders, valves, cooling elements, pumps, solenoids and other devices, and the communication of process commands and information between the machine and an operator. To facilitate this operation, such machines have been equipped with logic process controllers for programmably controlling the operating sequence of the various machine elements so that the machine operates more efficiently and in accordance with a repeatable and more reliable process. It is known in the art to make such logic controllers programmable by using dedicated programmable controllers programmed in accordance with well known ladder logic techniques, or with any one of a number of alternative programming methods, many of which make use of state of the art microprocessors.

Programmable logic controllers have, in the machines of the prior art, been interfaced with operator stations through which data, setpoints, and other commands may be input by an operator for use by the logic controller program in operating the machine. This has motivated the development of control systems which perform in accordance with digital techniques. It has been found, however, that the operation of such machines in accordance with the processes which utilize digital techniques, and which most effectively use the digital capabilities of the programmable controllers, do not result in the most desirable performance of the machines. Such digital functions work effectively with a control of solenoids, certain valves, switches and other discrete state machine components by which the processes of a machine may in part be implemented, but such digital techniques have not alone provided the capabilities of analog control where optimization analog parameters such as temperatures, pressures, machine part and material velocities, etc., is needed to achieve the desired quality of the process and the product.

Accordingly, control systems have been developed, such as the DPC-270 control system manufactured by Cincinnati Milacron, Inc., Electronic Systems Division, Lebanon, Ohio and described in the manufacturer's publication assembly No. 7-000-05378C, published by Cincinnati Milacron Marketing Company 1987, and expressly incorporated herein by reference. The DPC-270 control system includes an operator station through which data is entered in digital form by an operator and setpoints and prompts are displayed on an operator panel. The information is communicated from the operator station to and from a programmable logic controller having a special purpose dedicated programmable processor and architecture which control the real time process steps and operating sequence of a molding machine. The DPC-270 employs a combination of both digital and analog control signals which it delivers to the machine, and a combination of digital and analog measurement signals which it receives from the machine.

The increased degree of sophistication of such machine controls and of the processes by which they are controlled has increased the need for more effective and efficient communication between the operator and the process being controlled. The reliability and efficiency of the process has been recognized as largely dependent upon the availability of process information to the operator and supervisors of the process and machine and upon the ability of the operator to communicate and control and modify parameters of the programmed controller. This has resulted in the need for effective access and display of clear information regarding machine performance and process parameters as well as the ability to analyze and modify information regarding the process progression and machine status. The requirements of real time machine and process control and those of effective operator interface and process analysis are different. Attempts in the prior art at improvements in the systems have involved compromise of one objective or the other.

Requirements for information transfer between the machine and the operator rapidly change. Changes in the process and operation of the machinery being controlled is less rapid. In addition, the logic process control program is, by its nature, very machine specific and application specific. Most machine specific functions require initial controller configuration but little or no change thereafter. Many application specific functions require occasional reprogramming or setting of the machines, but little or no controller reconfiguration. Effective communication between the operator and the machine so as to provide the most useful process analysis and control requires more frequent programming changes, an operation which, with controllers of the prior art, has been an engineering intensive operation. This is particularly the case where analog control of the machine is employed. In addition, there are real time functions of the machine which must be accessible to immediate operator intervention and control. The systems of the prior art have not efficiently and simultaneously addressed these different requirement needs. Accordingly, there is a need for operator efficiency and capability in the plastics processing machine art.

SUMMARY OF THE INVENTION

It is an objective of the present invention to provide a programmed logic controlled plastics processing machine having a dedicated processor for controlling the real time operations of the machine, with a flexible programmable digital operator station and station interface which will provide a flexible means for communication with the controller and the machine. It is a more particular objective of the present invention to provide a general purpose digital operator station interface with a machine having an analog function controller in an architecture which will provide the capability of separating the real time interaction among the machine, the operator and the controller from general purpose program controlled data communication with the operator and the process analysis of the machine operation.

According to principles of the present invention there is provided the plastics molding machine having a dedicated programmed logic controller for controlling the real time functions of the machine, an operator station for displaying data relating to the performance and operation of the machine to the operator and for accepting input data from the operator, an operator station interface which includes a general purpose programmable, digital computer and combined through an architecture providing communication links among the controller, the computer and the operator station. The operator station is provided with a communications link directly with the controller to provide direct positive real time control of the machine functions by the operator particularly where operator intervention is required. According to further principles of the present invention, the controller is provided with both digital and analog output capability for controlling and monitoring both digital and analog functions of the machine.

In accordance with the preferred embodiment of the invention, there is further provided in the general purpose computer having a standardized operating system capable of running general purpose application software for assisting the analysis of data process performance and for communicating with communication ports and peripheral devices. There is further provided a program sequence of operation which renders the operator station interface capable of monitoring diagnostic functions of the controller and the machine, of sound alarms regarding conditions of the machine, of communicating setpoints and receiving performance data from the machine, and of receiving input data from the operator station. The programmed functions of the operator station interface further provide for controlling displays at the operator station, for communication of information to the operator regarding the system performance on the display, and for coordinating the display with operator commands.

The present invention in its preferred embodiment provides a plastic processing machine which operates with multiple levels of parallel processing. The control architecture includes three levels which process simultaneously, with each level itself performing parallel multiple processing. On one level, a real time analog processor simultaneously performs the real time closed loop machine control and performs real time high speed switching in response to machine element feedback signals. On another level, a programmed logic processor controller employs digital techniques in multiple processors to control the machine operating sequence. On the highest level, a general purpose open architecture computer interfaces with the operator, accepting input instructions and set point data which are formatted and communicated to the controller, and displaying information to the operator. The open architecture allows for the inclusion of additional analysis and control functions, particularly those relating to the exchange of information between the human operators and process management on the one hand and the machine on the other hand, and without altering the machine specific parts of the control.

Advantages of the present invention are provided by machine control architecture which separates the real time programmed and manual commands which deliver and receive digital and analog signals from the machine from general purpose data processing of machine input and output and other analysis functions. The real time machine control is provided in dedicated logic control devices while the input/output and analysis functions are performed in flexible general purpose off the shelf digital processing equipment which is capable of interacting with and compatible of employing off the shelf software. Accordingly, statistical process control programs, general process analysis programs, data logging and other functions can be provided and freely changed and revised without requiring changing or reprogramming of the machine's specific functions controlled by the designed controller. The linking of the operator interface computer to both the controller and the operator station interface provides a capability of inputting and outputting data while providing direct programmed control in real time of the machine specific functions of the process and direct manual control in real time of certain machine functions. The machine control so provided is independent of the timing and operation of the general purpose interface computer and will perform certain operations even in the case of failure of the general purpose computer. The independent programmability of the operator station interface allows for flexible and up-to-date customizing of operator station displays to serve the needs of the user and to accommodate changes in application software which may be freely employed in the general purpose computer without affecting the basic machine control performed by the process controller.

These and other objects and advantages of the present invention will be more readily apparent from the following detailed description of the drawings in which:

Figure 1:
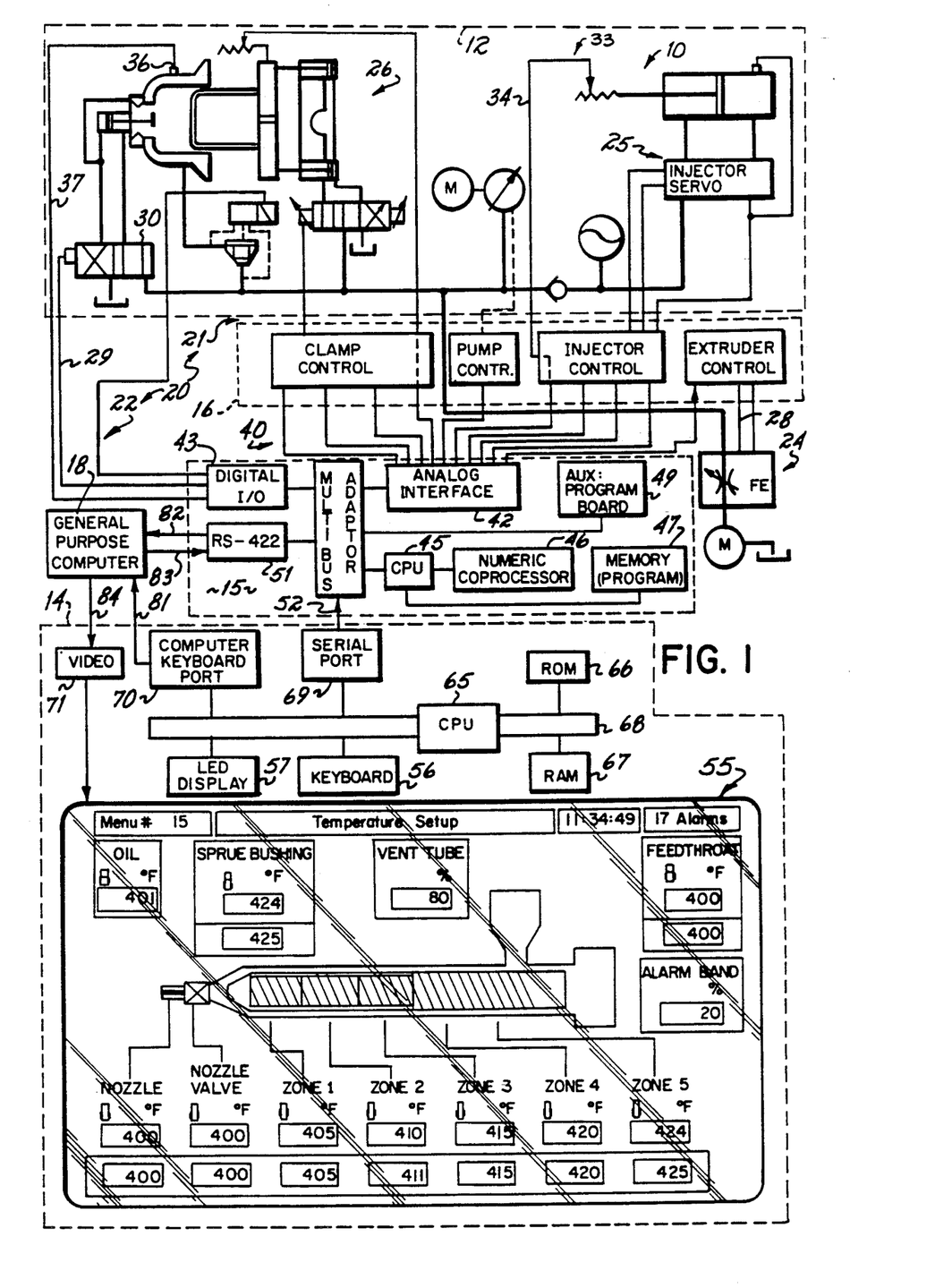
FIG. 1 is a block diagram illustrating one preferred embodiment of an injection molding machine according to principles of the present invention.

Referring to FIG. 1, an injection molding machine 10 according to principles of the present invention is shown diagrammatically illustrating particularly those components to which the present invention relates and those which will aid in its understanding. The operative components illustrated in FIG. 1 include an injection molding machine mechanical and fluid control system 12, an operator station 14, a dedicated programmable logic controller 15, an analog function module 16, and an operator station interface 18.

The machine control system 12 as shown includes the operable machine elements of the machine 12 which function under program control in response to output signals on electrical control lines 20, some of which are analog signals on lines 21 and others of which are digital signals on lines 22. The machine elements may include, as for example in the injection molding machine shown, an extruder fluid pressure driver 24, a fluid servo controlled injector 25, a mold and clamp assembly 26, heating and cooling elements (not shown), part ejector mechanisms (not shown) and other elements which may vary in type from machine to machine. These generally operate under power applied through the controlled activation of pumps, valves, motors, switches and other basic machine components. The details of such mechanical, thermal, pneumatic and hydraulic machine elements are not material to understanding the present invention.

The machine elements are operated under the control of output signals, such as the analog output signal on line 28 for controlling the position of a control valve of the extruder 24, and the digital output signal on line 29 for actuating a solenoid valve 30. Feedback signals are also generated by sensing elements in the system 12, such as by an injection piston position transducer 33 which generates an analog feedback signal on line 34, and by a clamp pressure limit transducer 36 which generates a digital feedback signal on line 37. The systems 12 for which the present invention is most advantageous are those having a plurality of elements which each operate in response to at least one of a plurality of output signals including a plurality of digital signals and a plurality of analog signals, and which produce a combined plurality of analog and of digital feedback signals in the course of operation during which a program controlled plastic forming process is performed.

The analog function module 16 is a real-time analog signal processor which performs real-time closed loop servo control of machine elements, and high speed real-time switching of machine functions in response to real-time analog feedback signals. The real-time closed loop servo control is accomplished with servo amplifiers and related devices in the processor 16 which accept analog control signals from the controller and analog feedback signals from the machine elements 12 to provide fast responding machine operation. High speed switching is accomplished by the comparison of feedback signals, with, for example, analog threshold signals from the controller 15 to generate digital real-time output signals to perform high speed switching of the machine elements 12. This real-time analog processing provides faster and more accurate response at less cost than those systems which employ digital control in the these control loops.

The module 16 also includes electrical power amplifiers and drivers which translate the analog signals to proper power levels for transmission between the lines 31 which connect the module 16 to the machine elements of the system 12 and leads 40 which connect the module 16 to the controller 15. Control signals from the controller 15 received on certain of the lines 40 are translated to output signals on certain of the lines 21. The module 16 also transforms analog feedback signals from certain of the lines 21 into monitoring signals on certain of the lines 40 at the proper level and form for process monitoring by the controller 15. This module 16 or other circuitry may similarly transform digital feedback signals to monitoring signals of the proper levels and waveforms for use by the controller 15.

The programmable logic controller 15 controls the real time functions of the machine. It includes an analog interface board 42, which is a general purpose analog input/output controller which interfaces between the analog module 16 and the controller's program control. The board 42 performs multiplexed digital-to-analog and analog-to-digital conversion of the control signals the analog machine functions. The analog interface 42 functions to generate output signals which contain setpoint information such as temperature, part positions, and velocities, and to detect analog events such as temperature limits, positions of machine elements, pressure levels, and similar values. A digital input/output board 43 is provided to perform similar functions for digital control, output and feedback signals. The board 43 also generates digital output signals, such as on and off signals to heating elements, in response to threshold detection by analog interface 42.

A processor board is provided in the controller 15 which contains a CPU 45, a numeric coprocessor 46 and memory 47 which contains a program. These components contain and run a machine specific control program which controls the machine setup and process sequences. Such programs are conventional to machines of this type and have been traditionally written in a language called ladder logic. More recently, machine control languages specific to the machines of various manufacturers have replaced the ladder logic programs. Cincinnati Milacron, Inc., for example, employs its own version of programming language called MCL, which is described in the company's publication number 7-000-0516PA of the Electronic Systems Division of Cincinnati Milacron, Inc. and available through the company's sales office together with program software packages for use with its controllers. Other such programming languages are provided by other manufacturers for their controllers. These do not form part of the present invention. Such programs are used to program the processor 45 of the controller 15 to the machine user's application. Similarly, an auxiliary program board 49 is provided to expand the programmed control capabilities of the controller 15. In the preferred embodiments, both the processor 45 and the auxiliary processor 49 are Intel 80386 microprocessors with 64 kilobytes RAM.

A multibus adapter board 50 is provided in the controller 15 for interconnecting the processing components 45, 46, 47 and 49 of the controller 15 with the input/output components, analog interface 42, digital I/O board 43, and a pair of serial interfaces 51 and 52. It communicates by connecting the I/O devices to the processor components through a conventional bus, preferably an Intel Multibus, carried by a passive backplane (not shown).

Figure 2A:
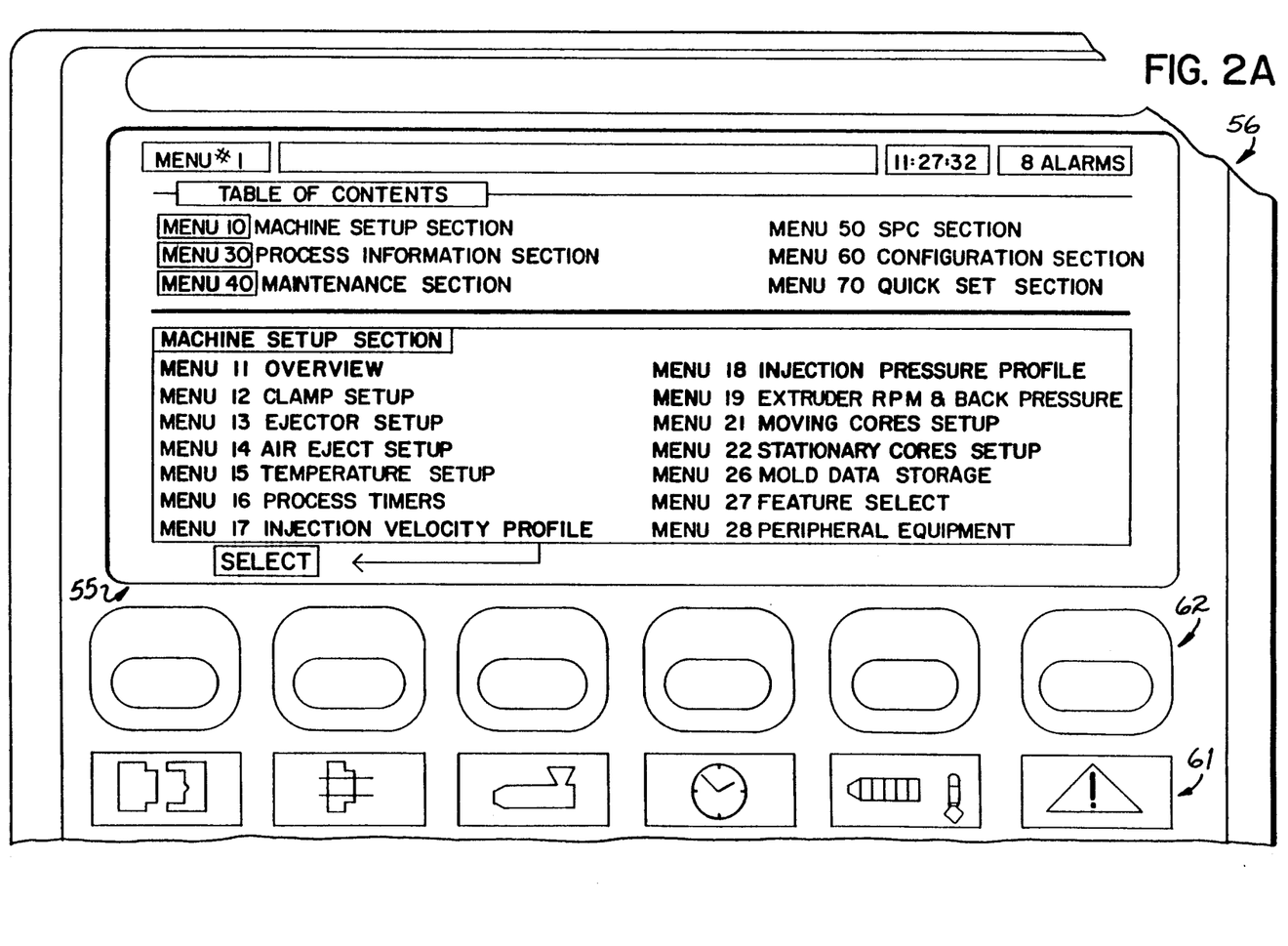
FIG. 2A and 2B are a two part diagram of operator station panel of the machine of FIG. 1.
Figure 2B:
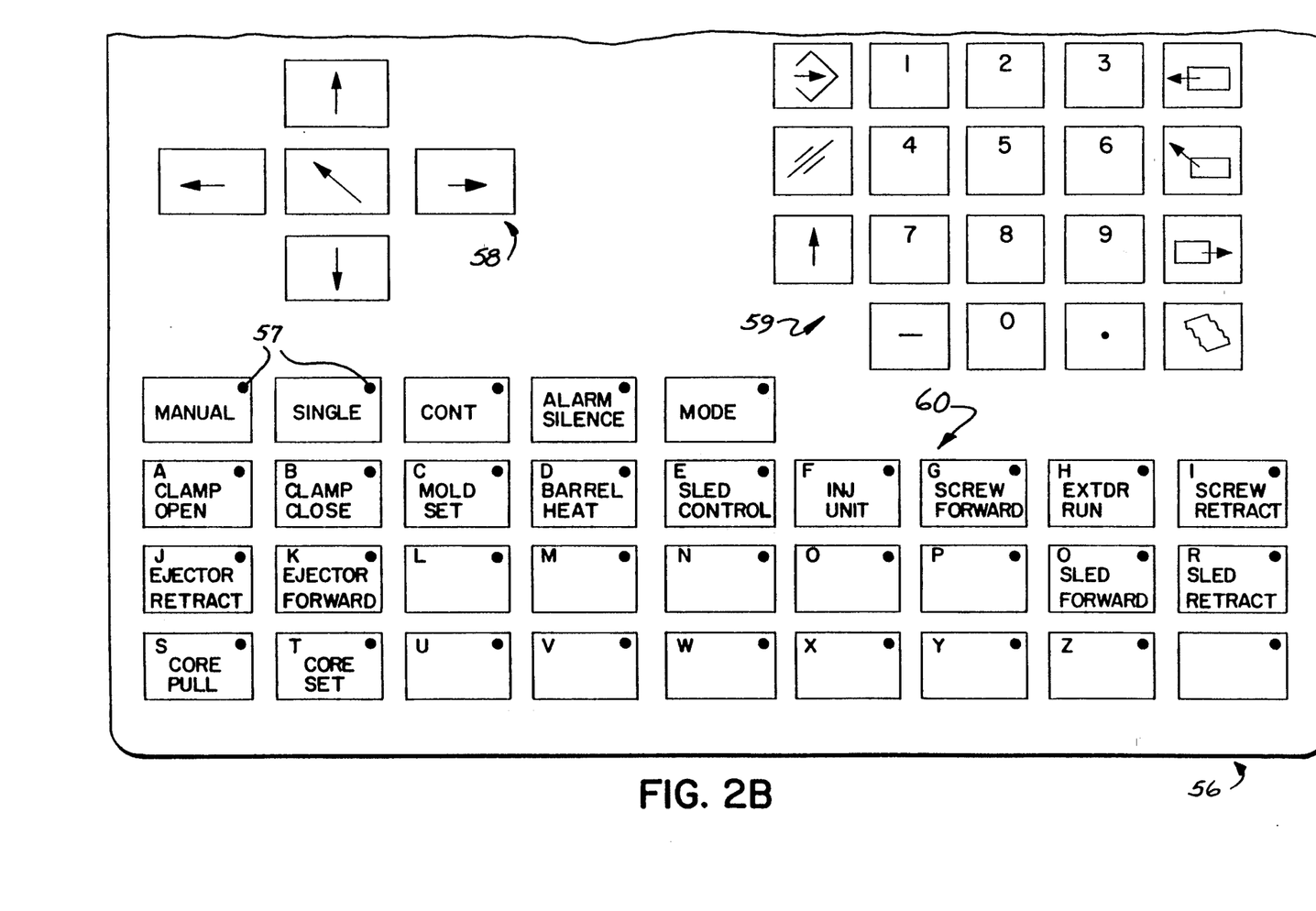

Referring to FIGS. 1, 2A and 2B the operator station 14 of the illustrated and preferred embodiment includes an electroluminescent display 55 having a display resolution of 640×200 pixels or greater. The station 14 is also provided with a data entry keyboard 56 having a plurality of keys arranged in a matrix and used to generate input signals for the entry of data and commands for the controller 15 and to direct the operation of the display 55. Associated with the keys of the keyboard 56 are light emitting diodes (LEDs) for displaying function information to the operator. The keys include a cursor control set of keys 58, a data entry keypad 59, a set of alphanumeric entry keys 60 which also serve in an alternate keyboard selectable mode to serve as manual function keys as the legends so designate, a row of machine set up keys 61 and a row of software defined keys 62. The operator station 14 is operated under the control of a microprocessor 65 which connects through a bus 66 with a programmed read only memory (PROM) 67, a volatile random access memory (RAM) 68, and the I/O devices which include the keyboard 56, the keyboard LEDs 57, a serial port 69 for communication directly with the serial port 52 of the controller 15 when the keyboard is in a manual mode, and through an IBM compatible keyboard port 70 to the operator station interface general purpose computer 18. A video port 71 is also provided to accept video display signals from the computer 18 to the display 55.

The operator station interface 18 includes a general purpose, DOS based computer having, in the preferred embodiment an Intel 80286 microprocessor. The computer of the interface 18 may be any industrial grade commercially available computer suitably configured. The operator station interface is provided with a command data input 81 connected from the keyboard port 70 of the operator station 14 and a monitoring data input 82 connected from the controller serial interface 51 which is RS422 port. The interface 18 also has a command signal output 83 connected through the RS422 port 51 of the controller 15 and a display signal output 84 connected to the video input 71 of the operator station 14. The operator station interface 18 is an intelligent screen controller which performs the function of creating the screen displays on the screen 55 of the operator station 14. It communicates between the controller 15 and the operator station 14, accepting engineering set point and other data from the keyboard 56 through selected menus and converts the input data to machine units and sends command signals to controller 15. It also accepts monitoring signals from the controller 15, converts the signal numeric data to appropriate units and generates video display signals to the operator station 14 for display of user perceivable visual information on the screen 55.

The computer of the operator interface 18 may be programmed in any one of a number languages. It is preferably equipped with a disk based operating system. Borland Turbo "C" language has been found currently most suitable for the application. The operator station interface directs all of the control functions and information handling functions of the machine, except for the real-time communication with the machine element controls, and except for the transmission of manual control signals from the operator station 14 to the controller 17, a mode primarily for use in emergency or abnormal circumstances. The computer may be provided with general "off-the-shelf" software such as spreadsheets, statistical process control programs and other application software which may be run without interruption of the programmed control of the machine 10 by the controller 15.

The Industrial PC of the operator station interface 18 provides the "window" into the plastics process by providing the capability for a commercial implementation for the screens and the use of data management software. The PC contains a power supply module, processor module with 640K of memory, a non-volatile storage module for the application programs, a real-time clock, and an RS-422 port for communications with the controller 15 serial interface 51. Optional interfaces for mold data storage, peripheral communications to devices such as chillers, and host communications to additional computer modules.

The function of the operator station 14 is to interface the controller 15 and the industrial computer 18 to the machine operator. This is accomplished by displaying information on the monitor 55 and relaying key depression input signals initialed by the operator from the keyboard 56. The operator's station physically consists of an interface printed circuit board, an LED/Keyboard printed circuit board, and electroluminescent panel, and packaging.

The CPU 65 of the station 14 uses an 80C31 processor to perform local processing of keyboard and LED information. The local processing directs serial transmission of keyboard data to the controller 15 through the keyboard serial port 70 to the IBM compatible PC in the operator station interface 18. IBM CGA video signals on the output line 84 from the interface 18 are also translated to the display 55 by the video signal processor 71 in the station 14.

The CPU 65 is in the preferred and illustrated embodiment an 80C31 microcontroller with a 11.059 MHZ crystal oscillator. The frequency was chosen to facilitate the generation of serial baud rates and minimize processing time. The station program memory is contained within the 8K to 32K byte CMOS EPROM 66. Incorporated within the microcontroller 65 is 128 bytes of RAM. An additional 8K bytes of CMOS RAM is provided in the memory 67 if it is required.

The serial interface 69 for direct manual communication to the controller 15 consists of a bidirectional, full, duplex, isolated channel. The channel is electrically equivalent to RS-422. The baud rate for the interface 69 is firmware selectable from 300 baud to 9600 baud. Standard integrated drivers and receivers are used to achieve RS-422 voltage and impedance specifications. This serial port is electrically isolated from the rest of the station circuit board through the use of optical isolators.

The keyboard interface 70 is intended to be used with a key matrix of up to 16×8 in size. The matrix is scanned by the microcontroller 65. Keyboard data is sent to the controller 15 through the serial port 69 and/or to the interface computer 18 through the standard IBM keyboard port 70.

The LED indicators 57 may number as many as 64. The LEDs are multiplexed in an 8×8 array, with 8 anode circuits and 8 cathode circuits. The preferred LED is a non-diffused, high efficiency unit.

Under normal operating circumstances, data received by the computer 18, through the keyboard interface 70 is made available to the computer of the interface 18 by providing an IBM Keyboard Port for the port 70. This port is electrically compatible with the IBM PC XT and AT, although some keycodes and commands are not supported and not used. Video signals are received by the station 14 from an IBM PC CGA/EGA card in the computer 18 through the display signal output 84. These signals are modulated before being presented to the station 14 with a pixel clock or dot clock (not shown), which is generated by dividing the horizontal sync by 912 (decimal) and using a phase locked loop to maintain synchronization.

Referring to FIGS. 2A and 2B, the keyboard panel 56 contains 64 key positions electrically arranged in an 8×8 matrix. The 32 LEDs are electrically arranged in an 8×4 matrix. The "Shift" key function is performed by the "Mode" toggle key which is not in the key matrix.

The serial link 69 to the controller 15 is an asynchronous, full-duplex channel. Each word transferred contains one start bit, eight data bits, one even parity bit, and one stop bit. The transmission rate preferred is 4800 Baud. The station CPU 65 has a watchdog timer which monitors LED data messages from the controller 15 to warn the operator of a failed link to the controller 15.

The 80C31 processor of the CPU 65 performs a keyboard scan and a LED scan, operates the keyboard serial interfaces 69 and 70, performs power-up diagnostics and other overhead functions. A phase locked loop extracts the pixel clock signals from the display signals from the computer color graphics adapter (CGA) card.

In the manual mode of operation, communication between the operator station 14 and the controller 15 is conducted via the asynchronous, full-duplex RS-422 channel 69 such that when a panel key is closed, a certain data pattern is sent to the controller 15. When the same key is released, a different data pattern is sent to the controller 15. Station 14 will emulate an IBM keyboard via the IBM Keyboard Interface 70 in its communication with the computer at interface 18. All key closures and releases are reported to the computer 18 in either shift mode.

The firmware in the ROM 66 of the station 14 will support two modes corresponding to manual and automatic (or alphameric) modes. The mode is controlled by a 'MODE' key. This key's LED will be on while in the 'ALPHAMERIC' mode and off while in the 'MANUAL' mode. On start-up, the firmware will initialize to alphameric mode. The serial link through the port 69 to the controller 15 is established when the mode is switched to "manual". The controller 15 can select a mode by sending the appropriate message to the operator station 14 to cause the mode to switch to "manual", for example, and the link 69 to be activated. While all key closures and releases are reported to the computer 18 when in either mode, when in "manual" mode, only the 32 keys are reported to the controller 15. When in "alphameric" mode, only 5 keys are reported to the controller 15. If the operator station 14 is in "manual" mode and the link to the controller 15 is interrupted, the firmware automatically switches to "alphameric" mode. If the link is re-established, the mode automatically switches back to "manual". The mode of the operator station, indicated by the LED on the Mode Key, is the only LED controlled by the Operator Station. All other LEDs are controlled by the base control through the serial link.

The physical connection between the controller 15 and the station 14, the physical connection between the controller 15 and the computer 18 and the physical connection between the computer 18 and the station 14 are such that data transfer between the station 14 and the controller 15 must pass through the computer of the interface 18. In most cases the overhead of the computer in mediating the transfer is acceptable. However, some aspects of the machine control application require the controller 15 to react to human operator input immediately. This is the reason the direct connection exists for selective limited communication between the station 14 and the controller 15, a connection used for manual machine operation, not for normal programmed operation of the machine. The transfer of data, however, through this interface 18 bypasses the direct link between the operator station 14 and the controller 15. This data is primarily used on the establishment of the set points of the machine for programmed control.

In programmed operation, the operator enters data by selecting various menus in accordance with information displayed on the panel 55 as shown in FIG. 2A. For example, by selecting menu 15, the operator will be presented with a screen display as shown in FIG. 1. This is accomplished by the computer 18 which receives the entry of the menu selection input signal on line 81, interprets it, and sends a display signal on line 84 to the station 14 at its video input 71 to display the graphics information of the display shown in FIG. 1. The computer 18 also sends signals in response to the selection which inform the operator of the variables to enter when in the new menu, including assigning labels on the display to the keys 62 (FIG. 2A). The operator can then change set points of the program in the controller 15 by entry of input data on the panel of the station 14, in the case illustrated, new temperature values. The new set point data so entered will alter the screen 55 to display the newly set values in their designated positions, which are, for example, the upper row of values along the bottom of the screen 55 in FIG. 1. The lower row displays the actual temperature values from machine elements which measure the temperature at the indicated zones with thermocouples or other such temperature transducer machine elements to generate analog feedback signals, to the controller 15 to arrive as digital monitoring signals at the input 82 to the computer 18 which reads the value to update the display.

Figure 3:
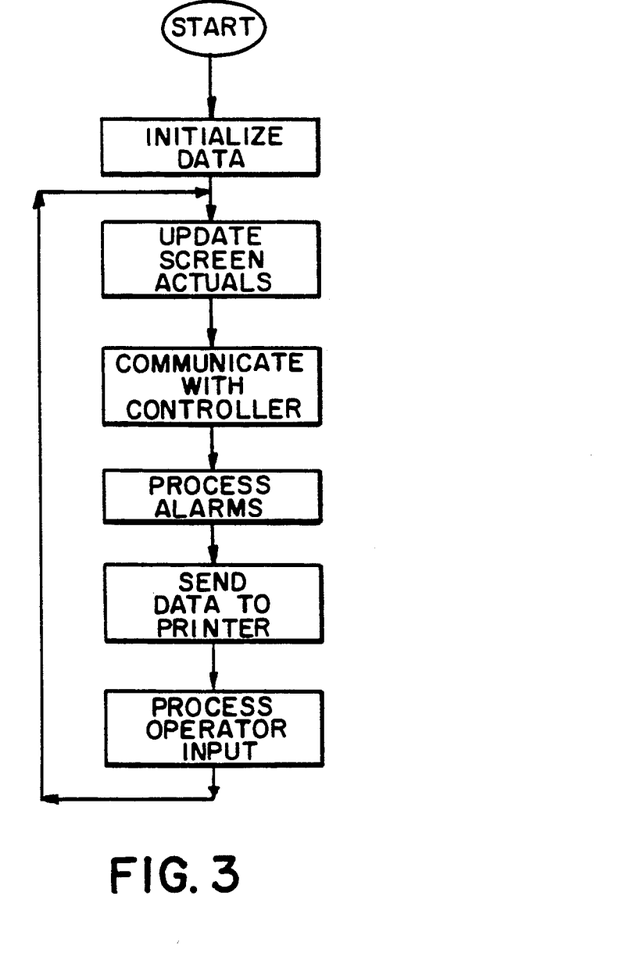
FIG. 3 is a flow chart of the operation of the operator station interface of the machine of FIG. 1.
Figure 4:
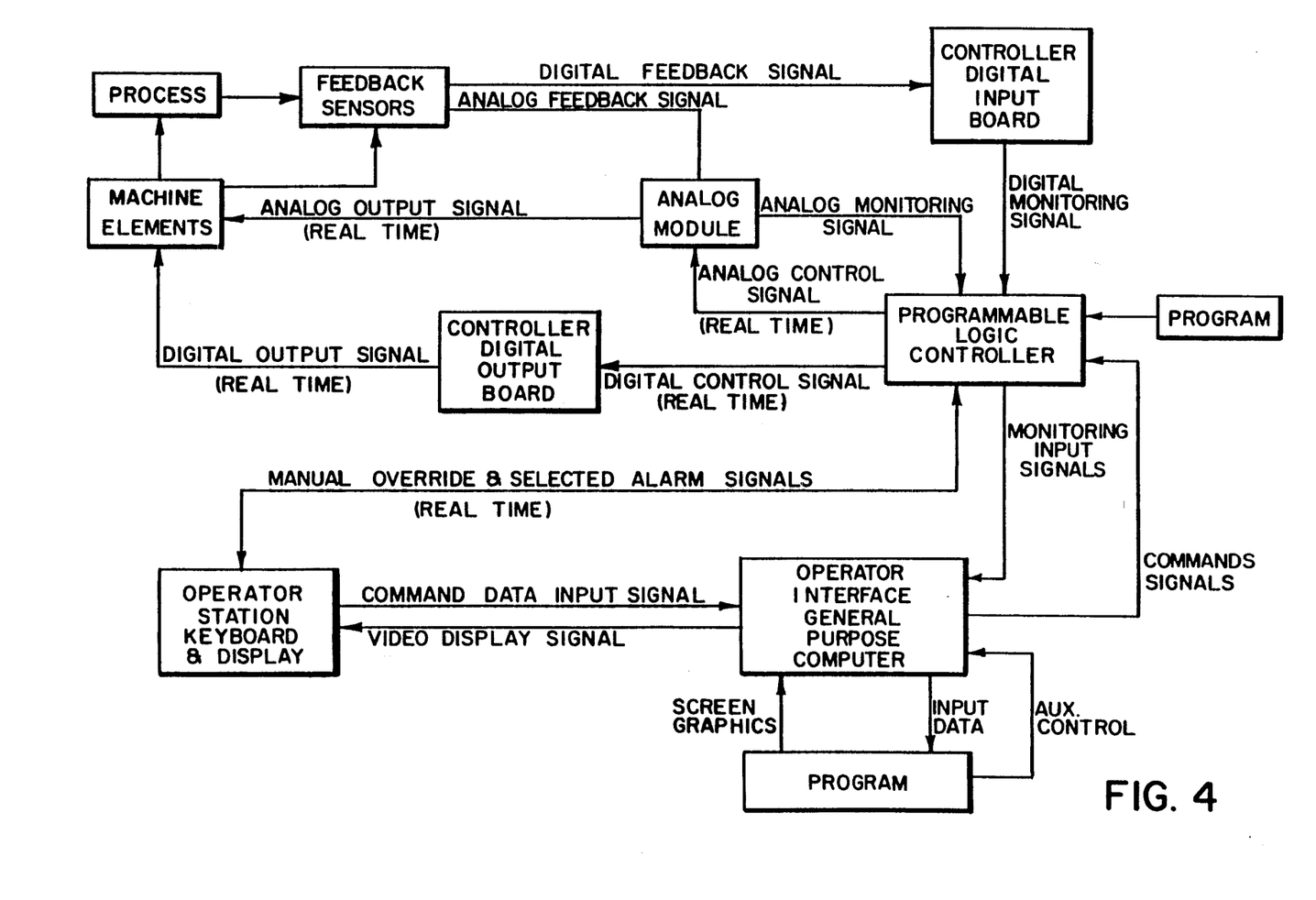
FIG. 4 is a block diagram illustrating information flow in the system of FIG. 1.

The computer 18 executes a simple loop as shown in the flow chart of FIG. 3. On start-up, certain standard set point data is initialized, then the continuous loop is entered by which the screen is updated over line 84 to post any data called for by the selected display menu. Then, set point data and other command signal information is sent to the controller through line 83. Next, alarms are processed by interpreting the monitoring signals from the controller 45 through input 82 so that commands, if induced by the alarm conditions, can be changed, and so that the display signals can be sent over line 84 and the information carried thereby can be used to update the screen 55. Preferably, a printer (not shown) is then fed data to record all events and information flow to produce a hard copy record of the history of the process. Then, keyboard entered input signals on line 81 are analyzed and any new data entered by the operator at the keyboard 56 is received. The loop then returns to reinitiate the screen display.

The loop is rapidly executed in relation to the real-time functions of the machine, as are the routines performed in each of the boxes illustrated in the flow chart. The program in the computer 18 directs the program commands to the controller 15, which is a slave to the computer 18 and will not itself initiate a message transfer. The computer 18 requests any information it desires from the controller 15, including the status of registers which store alarms and other feedback signals in the controller 15. In order for status indicators to be displayed on the screen 55 of the station 14, the computer 18 must solicit the information from the controller 15 and display it to the screen 55. This is done periodically by the loop shown in the flow chart of FIG. 3.

Having described the invention, what is claimed is the following:

1. A plastics molding machine comprising:
   a plurality of operable machine elements interconnected and interrelated so as to perform a plastics forming process in response to a plurality of program controlled output signals which include a plurality of analog output signals and a plurality of digital output signals;
   means for generating a plurality of feedback signals, including analog feedback signals and digital feedback signals, in response to information from said process and information from the operation of said machine elements;

a real time analog signal processor including means for generating said plurality of analog output signals in real time response to a plurality of real time control signals, and means for generating process monitoring signals in response to said analog feedback signals;

means for generating said plurality of digital output signals in real time response to a plurality of real time control signals, and means for generating process monitoring signals in response to said digital feedback signals;

a dedicated programmable logic process controller having programmed means for generating, in real time, said real time control signals, in accordance with a predetermined combination and sequence of steps and in accordance with a plurality of command signals;

an operator station including data entry means for accepting manually initiated input signals from an operator, and including display means for communicating visually perceivable process information to said operator in response to video signals;

an operator station interface including a programmable general purpose digital computer having at least two inputs including a command data input connected from said operator station and a monitoring data input connected from said controller, and having at least two outputs including a display signal output connected to said operator station and a command signal output connected to said controller;

means included in said controller for communicating said monitoring signals to said monitoring data input of said operator station interface; and programmed means in said operator station interface for controlling the operation of said computer to generate video signals on said display signal output in response to input signals on said command data input and in response to monitoring signals on said monitoring data input, and to generate command signals on said command signal output in response to input signals on said command data input and in response to monitoring signals on said monitoring data input.

2. The machine of claim 1 further comprising:
means for transmitting in real time, from said operator station to said controller, command signals in response to at least some of said input signals.

3. The machine of claim 1 further comprising:
means at said operator station for selecting data parameters relating to the control of said process and for entering data values for the selected parameters;

said programmed means including means for sending command signals to said controller in response to the selection of said parameters; and means at said controller for generating said output signals in accordance with said data values for said selected parameters.

4. The machine of claim 3 wherein said programmed means further comprises user reprogrammable means at said operator station interface for processing information from said monitoring signals.

5. A plastics molding machine comprising:
a plurality of operable machine elements interconnected and interrelated so as to perform a plastics forming process in response to at least one program controlled output signal;

means for generating at least one feedback signal in response to information from the performance of said process by said machine elements;

means for generating at least one process monitoring signal in response to said feedback signal;

a dedicated programmable logic process controller having programmed means for causing the controlled generation of said output signal in accordance with a predetermined combination and sequence of steps and in accordance with at least one command signal;

an operator station including means for accepting input signals and means for communicating operator perceivable process information to said operator in response to a display signal;

an operator station interface including a programmable general purpose digital computer having at least two inputs including a command data input connected from said operator station and a monitoring data input connected from said controller, and having a display signal output connected to said operator station;

means for communicating said monitoring signal to said monitoring data input of said operator station interface; and programmed means in said operator station interface for controlling the operation of said computer to generate, in response to an input signal at said inputs, a display signal on said display signal output.

6. The machine of claim 5 wherein:
said program controlled output signal includes at least one analog output signal;

said machine further comprises an analog interface including means for generating an analog output signal in real time response to a real time control signal; and said controller includes means for generating a programmed control signal.

7. The machine of claim 6 wherein said feedback signal generating means includes means for generating at least one analog feedback signal and wherein said analog interface includes means for generating process monitoring signals in response to said analog feedback signal.

8. The machine of claim 5 wherein said controller is operative to generate said output signal in accordance with the real time operation of said machine elements.

9. A plastics molding machine comprising:
a plurality of operable machine elements interconnected and interrelated so as to perform a plastics forming process in response to program controlled output signals including analog output signals;

means for generating feedback signals, including analog feedback signals from said machine elements;

a real time signal processor including means for generating said output signals in real-time response to control signals and said feedback signals, including said analog feedback signals;

a dedicated programmable logic process controller having programmed means for generating said control signals in accordance with a predetermined combination and sequence of steps and in accordance with a plurality of command signals;

an operator station including means for accepting entered data, and means for displaying information to an operator in response to display signals;

an operator station interface including a programmable general purpose digital computer having at least two inputs including a command data input connected to said operator station for receiving said entered data from and for transmitting display signals to, said operator station, and having means connected to said controller for transmitting said command signals to said controller;

programmed means in said operator station interface for controlling the operation of said computer to generate said display signals and to generate command signals in response to said entered data.

10. The machine of claim 9 wherein said processor is operable to generate analog output signals by closed loop servo control performed in real time response to analog signals.

11. The machine of claim 9 wherein said processor is operable to generate output switching control signals by a comparison, in real time, of analog control and feedback signals.

12. A plastics molding machine of claim 9 further comprising:

said operator station interface including means for receiving monitoring signals from said controller;

means for communicating said monitoring signal to said operator station interface; and programmed means in said operator station interface including means for controlling the operation of said computer to generate display signals in response to said monitoring signal.

13. The machine of claim 9 further comprising:

means for generating digital output signals in response to a plurality of control signals, and means for generating process monitoring signals in response to said feedback signals.

* * * * *